United States Patent [19]

Yasuda et al.

[11] Patent Number: 5,680,299
[45] Date of Patent: Oct. 21, 1997

[54] ELECTRIC POWER CONVERSION EQUIPMENT

[75] Inventors: Kouji Yasuda, Hitachinaka; Kiyoshi Nakata, Iwase-machi; Masato Suzuki, Urizura-machi; Mutsuhiro Terunuma, Mito, all of Japan

[73] Assignee: Hitachi, Ltd., Japan

[21] Appl. No.: 359,182

[22] Filed: Dec. 19, 1994

[30] Foreign Application Priority Data

Dec. 17, 1993 [JP] Japan .................... 5-317702

[51] Int. Cl.$^6$ ................................ H02M 7/5387
[52] U.S. Cl. ................................ 363/41; 363/98
[58] Field of Search ................ 363/40, 41, 95, 363/97, 98, 131, 132; 318/807, 811

[56] References Cited

U.S. PATENT DOCUMENTS

| 5,321,599 | 6/1994 | Tanamachi et al. | 363/41 |
| 5,361,196 | 11/1994 | Tanamachi et al. | 363/41 |
| 5,467,262 | 11/1995 | Nakata et al. | 363/41 |

FOREIGN PATENT DOCUMENTS

| 0 597 132 | 5/1994 | European Pat. Off. |
| 93/24989 | 9/1993 | WIPO |

OTHER PUBLICATIONS

"Technique for pulse elimination in pulsewidth-modulation inverters with no waveform discontinuity," D. Grant et al. IEE Proc. vol. 129, Pt. B., No. 4, Jul. 1982, pp. 205–210.

"Evaluating the Recent Inverter Control Methods," Denkisha no Kagaku, 1, Apr. 1993, published in Denkisha Kenkyuukai, pp. 13–18.

Primary Examiner—Stuart N. Hecker
Assistant Examiner—Y. J. Han
Attorney, Agent, or Firm—Evenson, McKeown, Edwards & Lenahan P.L.L.C.

[57] ABSTRACT

A two level inverter having a switching element the switching frequency of which is higher than that of GTO, and providing a continuous control substantially over a full range of output voltages wherein the two level inverter comprises as its pulse modes an asynchronous bipolar modulation mode, a multi-pulse mode of an overmodulation mode, and a one pulse mode, and wherein advantageously the multi-pulse mode and the one pulse mode are arranged to be changed, thereby to enable a continuous control of its output voltage and reduce tone changes in the magnetic noise as well.

5 Claims, 13 Drawing Sheets

ELECTRIC POWER CONVERSION EQUIPMENT

BACKGROUND OF THE INVENTION

This invention relates to power conversion equipment which converts a direct current into an alternating current or vice versa, and in particular it relates to an apparatus for controlling a pulse width modulation (PWM) inverter.

An example of prior art inverter modulation methods has been disclosed in an article entitled "Evaluating the Recent Inverter Control Methods" which appeared in the "Denkisha no Kagaku", pp 14, FIG. 1, April 1993, published by the Denkisha Kenkyuukai.

Figure 2:
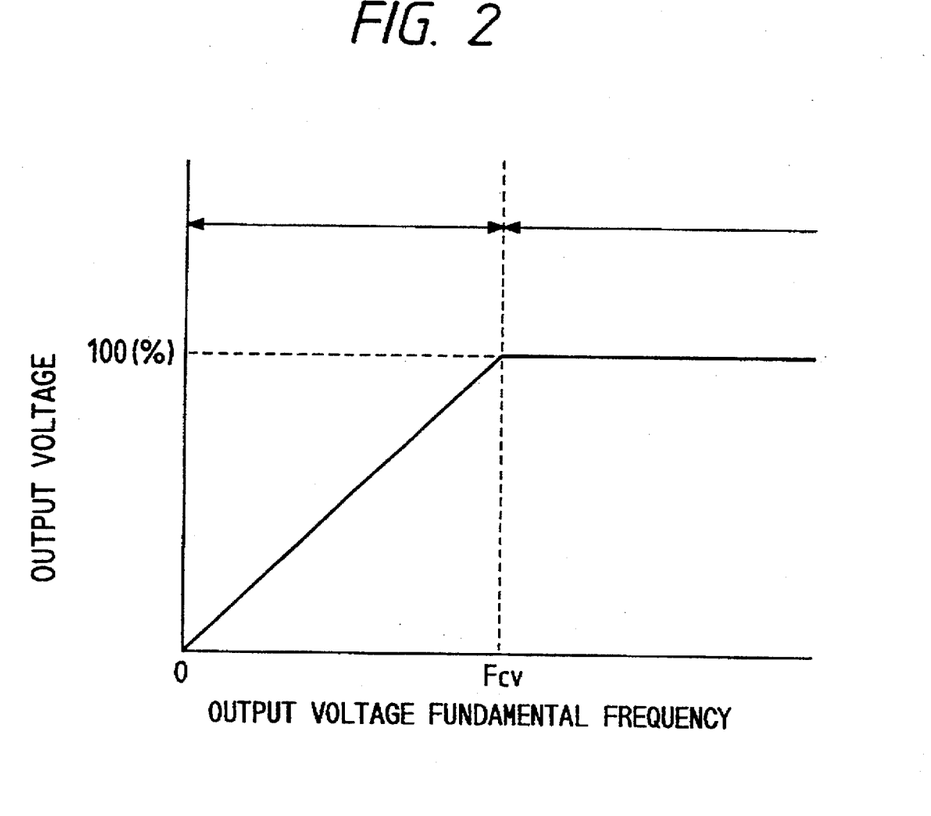
FIG. 2 is a graphic representation of operational characteristics of a traction motor inverter of the invention.

As illustrated in FIG. 2 herein, in a traction motor inverter a constant control is provided to maintain a constant ratio between the magnitude and the fundamental frequency of an output voltage when the fundamental frequency of the output voltage is low (which region will be referred to as a variable-voltage variable-frequency region), whereas a frequency control is provided while maintaining a maximum voltage value in a region in which the output voltage fundamental frequency increases such that the magnitude of its output voltage becomes a maximum (which region will be referred to as a constant-voltage variable-frequency region). Since in the variable-voltage variable-frequency region the output voltage is regulated by pulse width modulation control, a multi-pulse mode is utilized in which a half cycle of its output voltage comprises a plurality of voltage pulses. On the other hand, in the constant voltage variable-frequency region, in order to maximize its voltage usage rate and to minimize the size of the equipment, a one pulse mode is utilized in which a half cycle of its output voltage comprises a single broad pulse.

Figure 3:
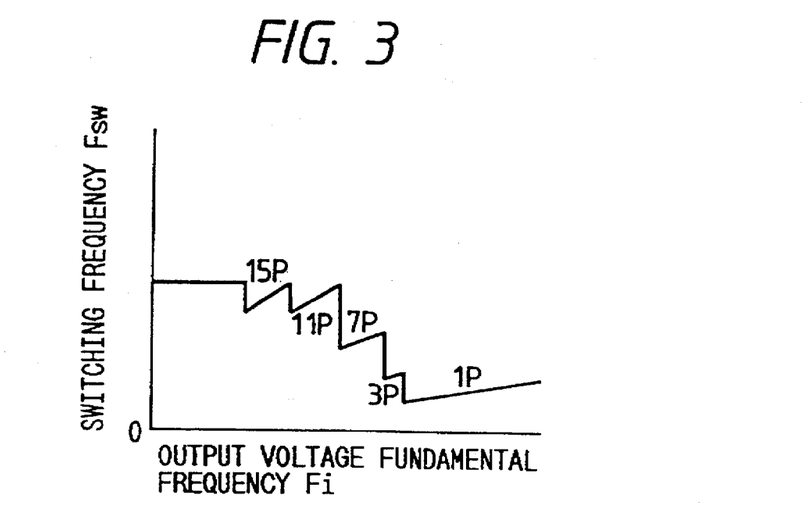
FIG. 3 is a graphic illustration of the operation of a prior art inverter modulation method.

A prior art inverter which uses GTO thyristors as its switching elements (referred to as a GTO inverter hereinafter), has adopted a multi-pulse mode according to a pulse count switching method which decreases the number of pulses to be included in one cycle thereof with increasing output voltage fundamental frequency, as shown in FIG. 3. This is due to an upper limitation of several hundred Hz imposed on a switching frequency in the GTO thyristor. In this method, however, a magnetic noise accompanies tone variation, thereby generating a cacophonic noise due to discontinuity between switching frequencies at the time the pulse count switching is employed.

Further, there is another problem associated with the GTO thyristor in that a voltage jump of approximately 10% occurs between a three-pulse mode output voltage (containing three pulses in a half cycle of its output voltage and a one-pulse mode output voltage) containing one pulse, depending on the limitation of a minimum OFF time in the GTO thyristor, thereby causing a fluctuation to take place in the torque generated by the traction motor at the time of switching from the three-pulse mode to the one-pulse mode.

SUMMARY OF THE INVENTION

A principal object of the invention is to provide a two-level inverter apparatus which is capable of controlling the magnitude of its output voltage from zero to a maximum value through a combination of a multi-pulse mode and a one-pulse mode, which substantially eliminates the discontinuity between the switching frequencies, thereby reducing the cacophonic magnetic noise accompanying tone variations, and which enables continuous control over substantially the entire region of the output voltage, by minimizing a gap in the output voltages between the multi-pulse mode and the one-pulse mode.

The aforementioned main object of the invention is achieved by the inverter apparatus according to the invention, which comprises: a multi-pulse generator for generating a gate control signal for outputting a bipolar modulation voltage which is controlled by pulse width modulation having a uniform pulse generation cycle over any cycle of its output voltage fundamental wave, and a gate control signal for outputting an overmodulation voltage the pulse width of which is widened in the vicinity of a peak of the output voltage fundamental wave relative to that in the vicinity of a zero cross point thereof; a one-pulse generator for generating a single pulse having the same polarity as that of the output voltage fundamental wave; and a selection circuit for selecting the output from either the multi-pulse generation means or the one pulse generation means, dependent on a condition of the number of pulses contained in one cycle of the output fundamental wave, a magnitude of an output voltage, a modulation ratio, or an output voltage fundamental frequency.

The multi-pulse generator is arranged so that a pulse generation cycle of a pulse width modulated portion on an output voltage waveform can be set independently of the output voltage fundamental frequency. Thus, its switching frequency at the time of bipolar modulation can be maintained constant, and its switching frequency at the time of overmodulation can be caused gradually to approach a predetermined switching frequency set for at the time of one-pulse, thereby eliminating discontinuity between switching frequencies.

Further, by controlling both the output voltage at which changes between the multi-pulse mode and the one-pulse mode are enabled, and the phase relative to the output voltage fundamental wave, it is possible to achieve the change between the modes smoothly, without causing fluctuations in the current and torque that the motor generates.

Other objects, advantages and novel features of the present invention will become apparent from the following detailed description of the invention when considered in conjunction with the accompanying drawings.

PREFERRED EMBODIMENTS

Preferred embodiments of the present invention will be described in the following with reference to FIGS. 1 to 17.

Figure 4:
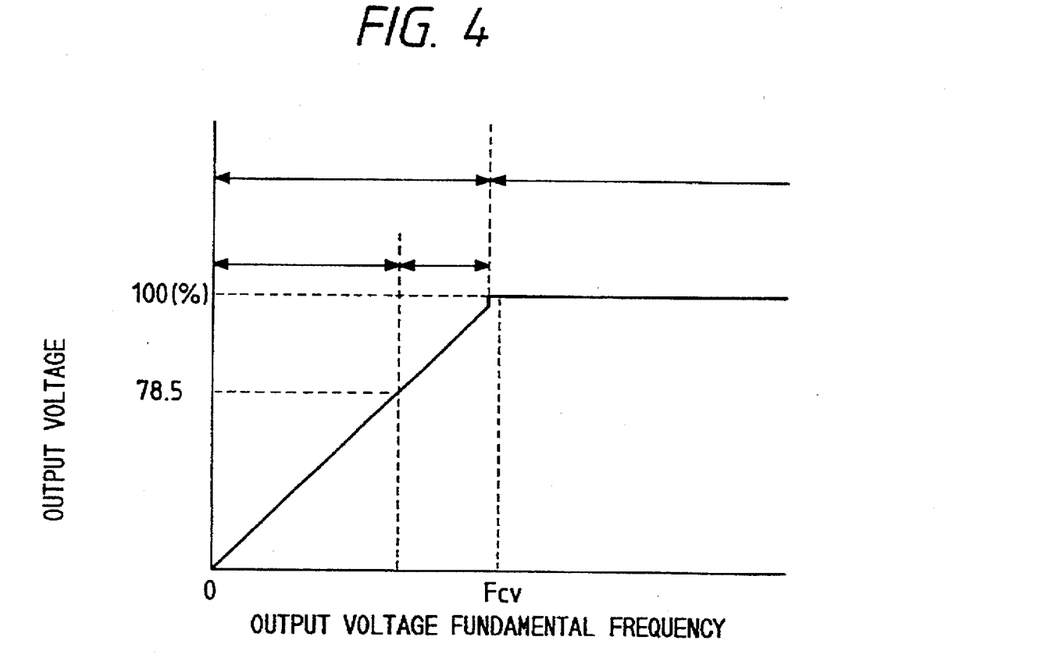
FIG. 4 is a graphic representation of operational characteristics of an inverter of the invention.

A diagram which illustrates a PWM mode of inverter operation according to the invention is shown in FIG. 4. The inverter is operated in a bipolar mode in its low output voltage range, in an overmodulation mode in its high output voltage range, and in a one pulse mode in its maximum output voltage range respectively.

Figure 1:
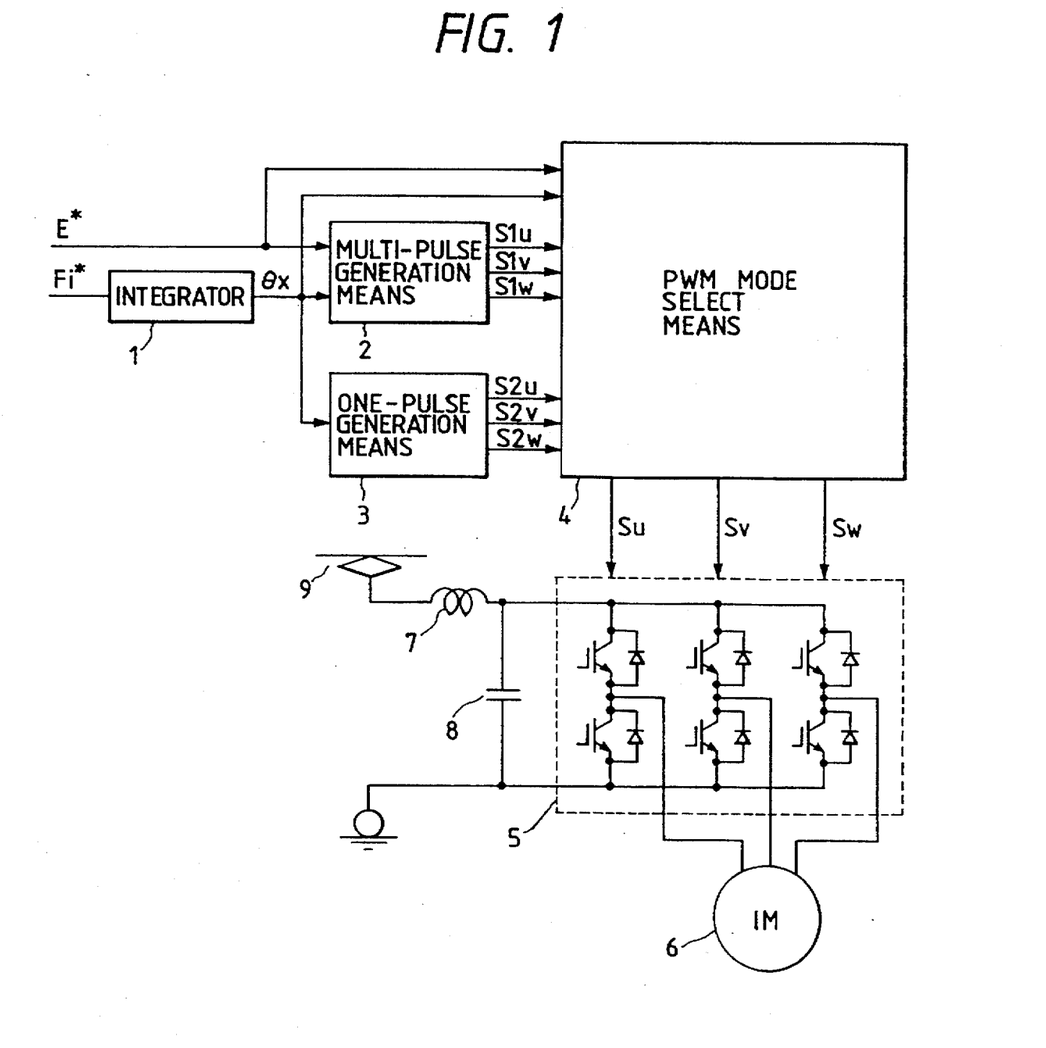
FIG. 1 is a schematic diagram illustrating one embodiment of the invention.

FIG. 1 is a schematic diagram of one embodiment of the invention, wherein numeral 6 is an induction motor, 5 is a two-level three-phase PWM inverter which drives the induction motor, 9 is an inverter power source from an aerial direct current supply, and 7, 8 denote respectively a filter reactor and a capacitor provided on the DC input side of the inverter.

A multi-pulse generator 2, a one-pulse generator 3 and a PWM mode select means 4 respectively generate inverter control signals Su, Sv, Sw (the subscript x representing any phase of u, v, w) in response to an output voltage command E* and a frequency command Fi*. The frequency command Fi* is integrated in integrator unit 1, to generate an output voltage fundamental wave phase θx of each phase. The inverter control signals $S1_x$, $S2_x$ and $S_x$ are characterized by a switching function which is defined to take 1 when the positive branch of the inverter is ON, and take 0 when the negative branch thereof is ON.

Figure 5:
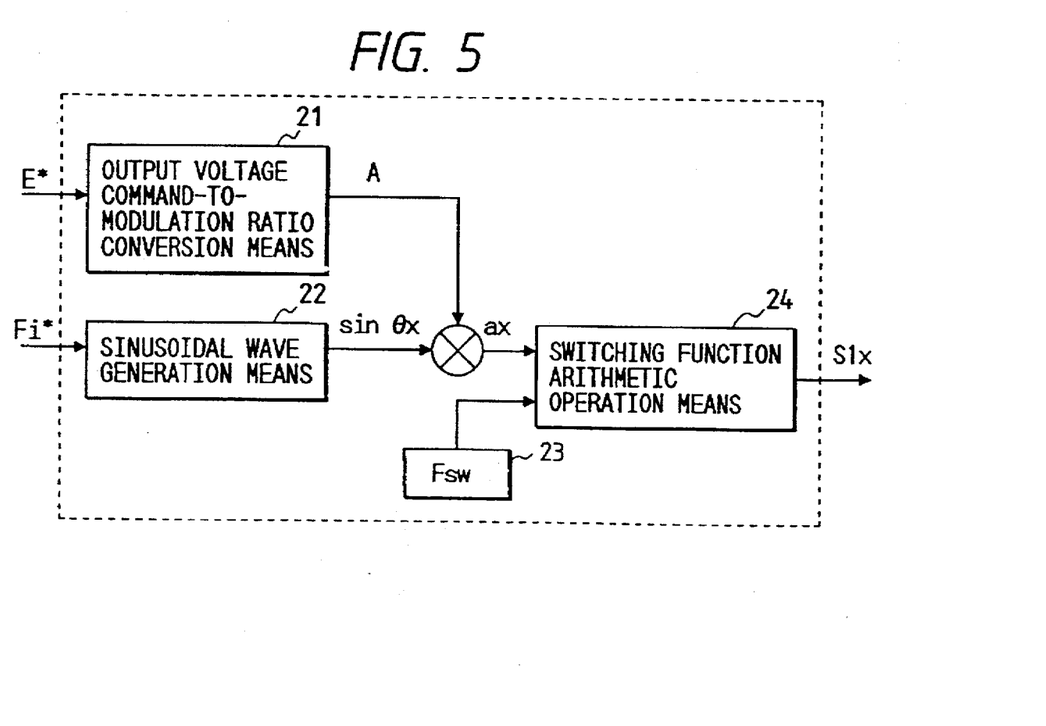
FIG. 5 is a schematic diagram illustrating one example of a configuration of a multi-pulse generation means of the invention.

An example of the multi-pulse generator 2 is shown in FIG. 5 (which indicates only one phase component of its contents). Here, switching functions in the bipolar mode and the overmodulation mode are generated by the same generator. An output voltage command-to-modulation ratio convertor 21 generates a signal indicative of a modulation ratio A, (that is, the amplitude of a modulation wave relative to that of the carrier), from an output voltage command E*. Assuming a carrier amplitude of 1, the ratio takes on a value of $0 \leq A \leq 1$ in the bipolar mode, and that $A > 1$ in the overmodulation mode. So that the magnitude of the output voltage fundamental wave coincides with the voltage command the relationship between E* and A is defined by equation 1 in the bipolar mode, and by equation 2 in the overmodulation mode.

$$E^* = \frac{\pi}{4} A \qquad \text{eq. 1}$$

-continued
$$E^* = \frac{1}{2}\left( \sin^{-1}\frac{1}{A} + \sqrt{1 - \frac{1}{A^2}} \right) \qquad \text{eq. 2}$$

When the sinusoidal wave generator 22 generates an output y=sin (x), sinθx of the output voltage fundamental wave phase θx (equivalent to modulation phase) is obtained. The latter is multipled by the modulation ratio A to produce a modulation wave $a_x$, which is input to a switching function computer 24, together with a carrier frequency Fc (which is equivalent to the switching frequency in the bipolar mode). The switching function computer 24 generates a carrier of triangular pulses having an amplitude of 1 and a frequency of Fc, which is compared with the value of the modulation wave $a_x$ to generate a switching function $S1_x$. Alternatively, the switching function may be obtained without using such triangular pulses, through computation of the modulation wave ax and its pulse intervals.

Figure 6:
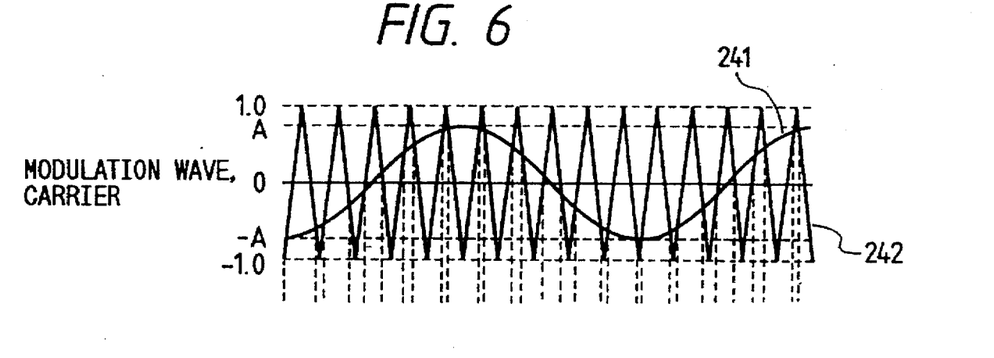
FIG. 6 shows a modulation waveform, a carrier waveform, and a switching function in a bipolar mode.
Figure 6A:
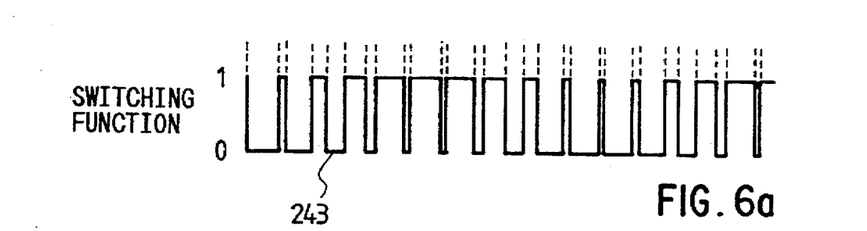
Figure 7:
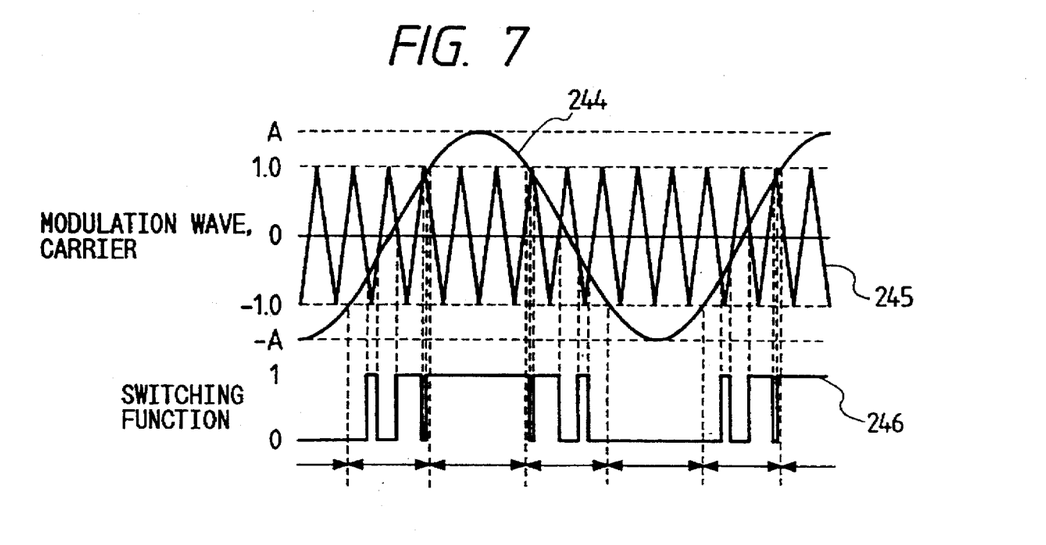
FIG. 7 shows a modulation waveform, a carrier waveform, and a switching function in an overmodulation mode.

FIGS. 6 and 7 show examples of waveforms of the switching functions according to the bipolar mode and the overmodulation mode, obtained through comparison with the triangular pulses.

In the inverter equipment according to the present invention, devices such as IGBTs, large capacity transistors or the like which can be operated at switching frequencies of several kHz are utilized as a switching element (hereinafter referred to as an IGBT inverter in general), and the modulation wave and the carrier are arranged to be asynchronous in the multi-pulse mode of operation. Thereby, the switching frequency is maintained constant in the bipolar mode, and gradually approaches a predetermined switching frequency in the one pulse mode which will be described later.

Since the modulation wave and the carrier wave are asynchronous in the multi-pulse mode, it is necessary for the carrier to have a substantially higher frequency (preferably approximately ten times higher, based on experience) than the modulation frequency.

Figure 8:
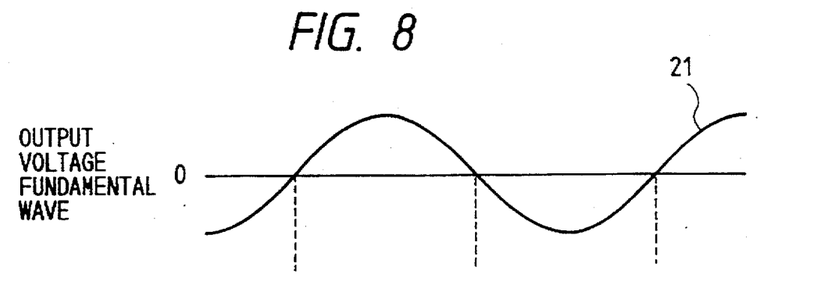
FIG. 8 is a diagram of a fundamental waveform of an output voltage and a switching function in one pulse mode associated thereto.
Figure 8A:
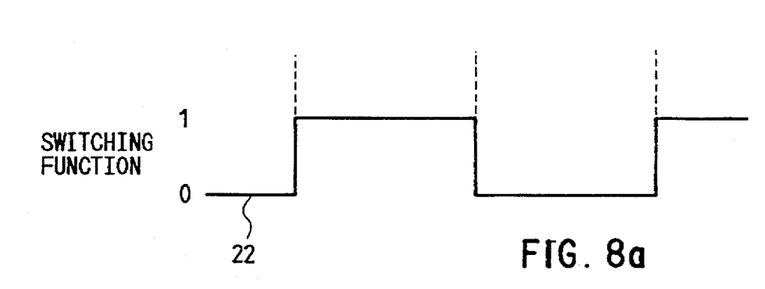

An example of a switching function waveform which is generated by the one pulse generator of FIG. 1 is shown in FIG. 8. When the sign of the fundamental wave of output voltage is positive, irrespective of its amplitude, the value of switching function $S2_x$ is 1, and when the sign is negative the value of $S2_x$ is 0.

Next, an arrangement for combining the multi-pulse mode and the one pulse mode so that the high output voltage range can be controlled smoothly will be described in the following.

A prior art overmodulation method is discussed in a publication entitled "Overmodulation control method for voltage-type three-phase PWM inverters" which appeared in the National Convention Proceedings No. 106, Heisei 3, Industrial Application Division, the Japan Society of Electric Engineers. According to this prior art, a six-step inverter operation is overextended to increase the modulation ratio in the overmodulation mode, thereby covering one pulse mode operation. However, when the one pulse mode is achieved by extending the overmodulation mode (that is, the overmodulation is realized by excessively increasing the modulation ratio) certain problems occur as follows.

Once problem is that the point at which the overmodulation mode is changed to the one pulse mode depends on its switching frequency. Thus, it cannot be set at discretion.

Another problem is that in the case where a modulation wave and a carrier wave are asynchronous in the overmodulation mode, pulses of the modulation wave in the vicinity of the zero-cross point may or may not be generated in the vicinity of a change between the overmodulation mode, and the one-pulse mode due to the influence of turn-on and turn-off time of the devices. As a result, the positive and the negative output voltages are balanced, thereby causing a beat phenomenon to be introduced by which a low frequency pulsation is superimposed on a load current of the inverter.

A third problem is that with reference to FIG. 7, an output voltage waveform (which is equivalent to the waveform of a switching function to be described later) can be divided into two portions: one having a uniform pulse interval (equidistance pulse), that is, having a uniform pulse generation cycle in the vicinity of the zero crossing of the modulation wave; and the other portion having a single broad pulse width component with its center corresponding to a peak of the modulation wave. Therefore, a switch-over from the overmodulation mode to the one-pulse mode may occur in any portion having an equidistance pulse in the overmodulation mode. In this instance, load current in the inverter fluctuates, which may result in a breakdown of switching elements due to overcurrents or a substantial fluctuation in motor torque.

In order to solve these problems, it is necessary to specify a particular shift voltage (hereinafter referred to as a shift voltage) at which a shift between the overmodulation and the one-pulse mode is allowed, and a particular phase (hereinafter referred to as a shift phase) in the output voltage fundamental wave at which the shift should be executed.

First, determination of the shift voltage will be described below.

It is desirable for the shift voltage to be set at a value in close proximity to the output voltage in the one-pulse mode operation (that is, close to 100%), because fluctuation in motor torque during mode shifting is minimized when the difference between its output voltage and its maximum value available is minimum.

Figure 9:
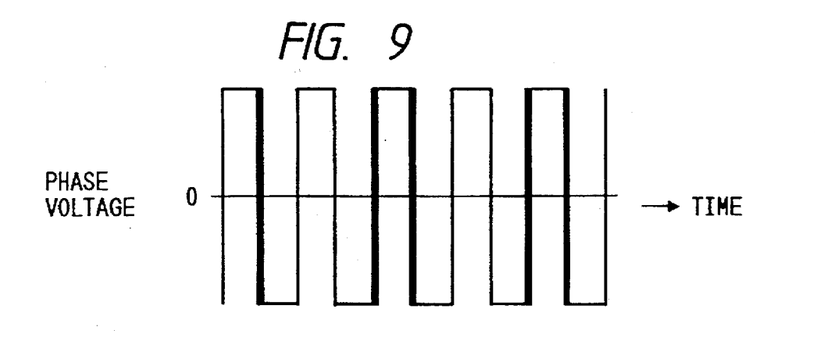
FIG. 9 is a graphic illustration of a beat phenomenon.
Figure 9A:
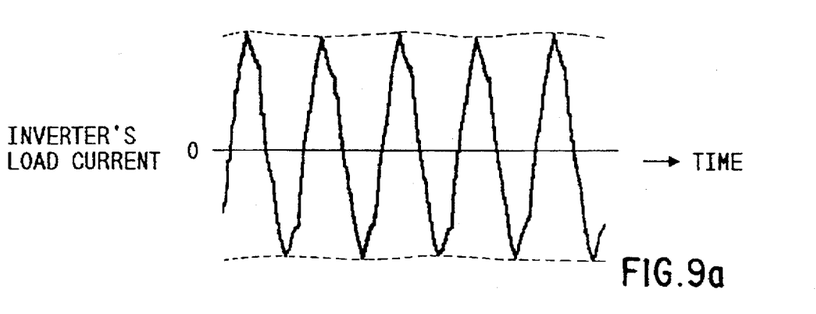

In the asynchronous PWM, however, individual voltage pulses contained in one cycle of the output voltage fundamental wave have a different pulse width according to each cycle, and when the number of pulses decreases in the vicinity of the zero crossing point of the output voltage fundamental wave as the output voltage in the overmodulation mode approaches 100%, its adverse effect becomes significant, causing an unbalance between the positive and negative polarities of output voltages, and eventually causing a beat phenomenon in the load current of the inverter. An example of such is shown in FIG. 9.

Figure 10:
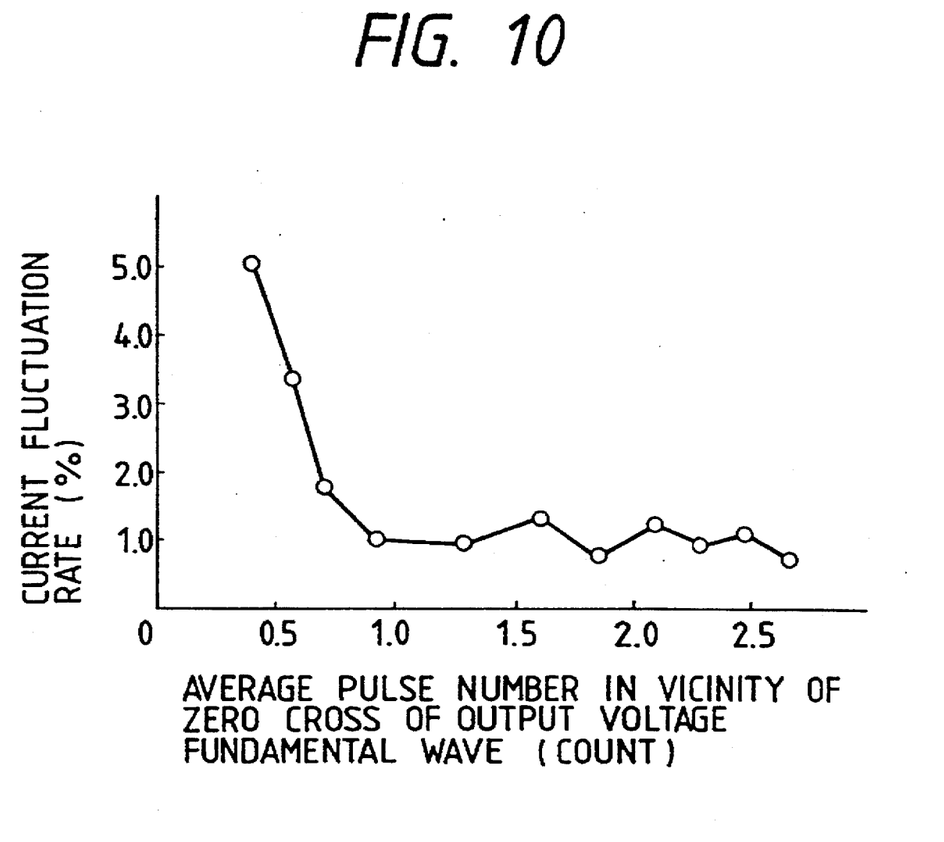
FIG. 10 is a diagram indicating a correlation between the average pulse number in the vicinity of the zero cross point of the output voltage fundamental wave, and the current pulsation.

FIG. 10 shows an example of the relationship between the average pulse number in the vicinity of the zero crossing point of the output voltage fundamental wave and current pulsation due to the beat phenomenon. A portion of the modulation wave where its absolute value is under 1.0 corresponds to an equidistance pulse region as shown in FIG. 7, thereby, an average pulse number can be obtained by equation 3. Further, the current pulsation ratio is defined by equation 4. As can been seen from FIG. 10 unless at least one pulse is secured in the vicinity of zero cross point of the output voltage fundamental wave, the low frequency pulsation in the inverter load current due to the beat phenomenon becomes extremely great.

AVERAGE PULSE NUMBER = $$\frac{\sin^{-1}\frac{1}{A}}{\frac{\pi}{2}} \times \frac{F_c}{F_i} \times \frac{1}{4} = \frac{F_c}{2\pi F_i} \times \sin^{-1}\frac{1}{A}$$ eq. 3

(current pulsation rate) = [(current peak-to-peak) − (current fundamental wave's peak-to-peak)]/[(current fundamental wave's peak-to-peak)] × 100 (%). EQ 4

Thereby, an appropriate shift voltage is preferably set at a value which ensures at least one voltage pulse in the vicinity of the zero cross point of the output voltage fundamental wave. Since this value depends on the output fundamental frequency Fi* and the carrier frequency Fc in the multi-pulse mode, it may be derived from calculation of these values. Alternatively, this value may be calculated and preset beforehand from an upper limit of the output voltage fundamental frequency Fi*.

Next, the manner in which the shift phase is controlled will be described.

Figure 11A:
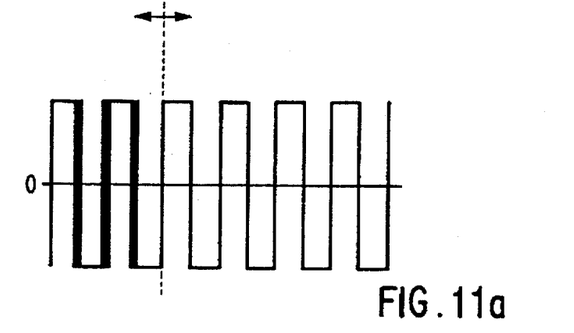
FIGS. 11(a) and 11(b) show that the transient current fluctuation immediately after mode change varies according to the shift phase.
Figure 11B:
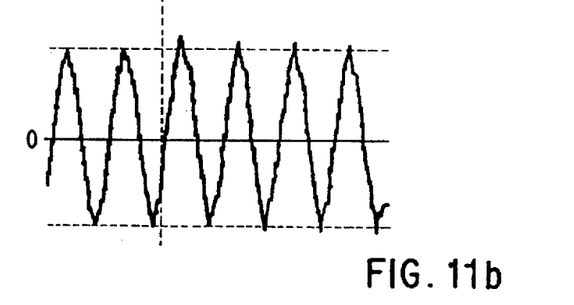
Figure 11C:
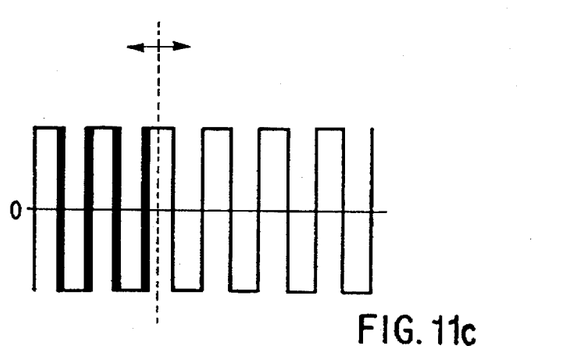
Figure 11D:
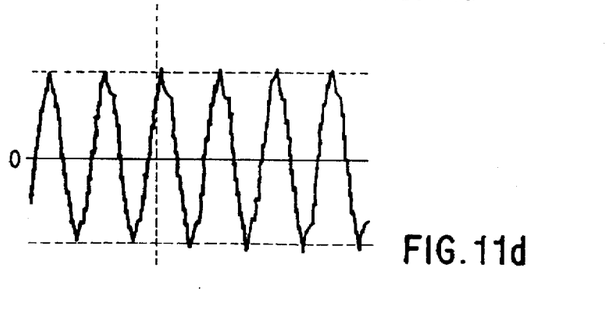
Figure 12:
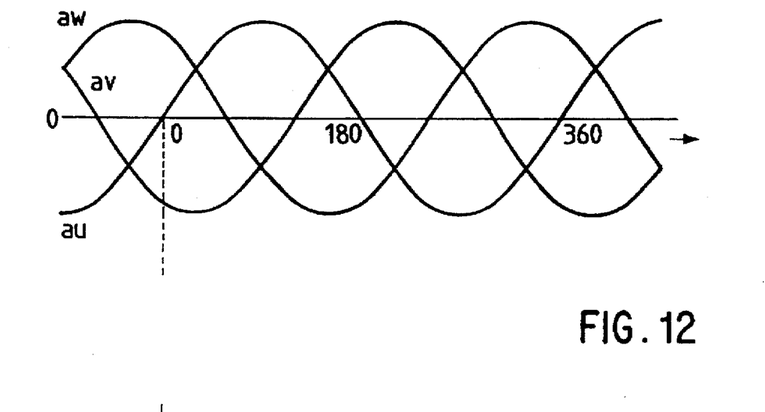
FIG. 12 is a diagram showing the mode change timing in FIG. 11(a)
Figure 12A:
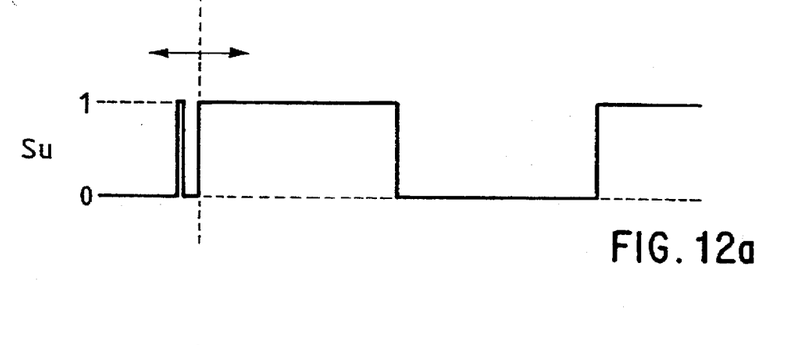
Figure 12B:
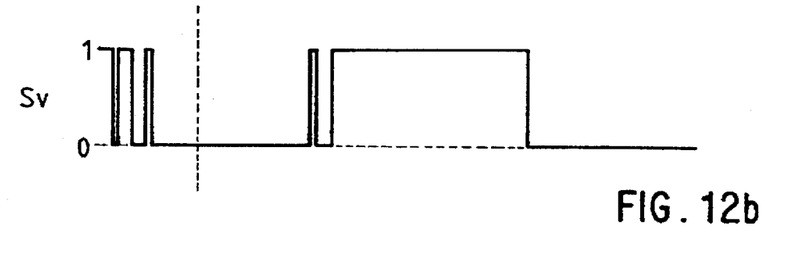
Figure 12C:
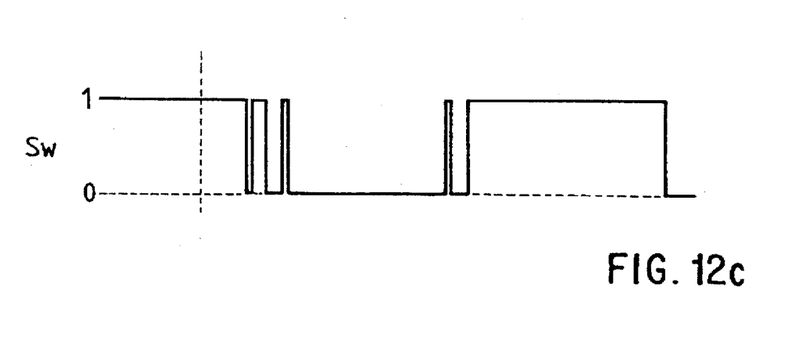
Figure 13:
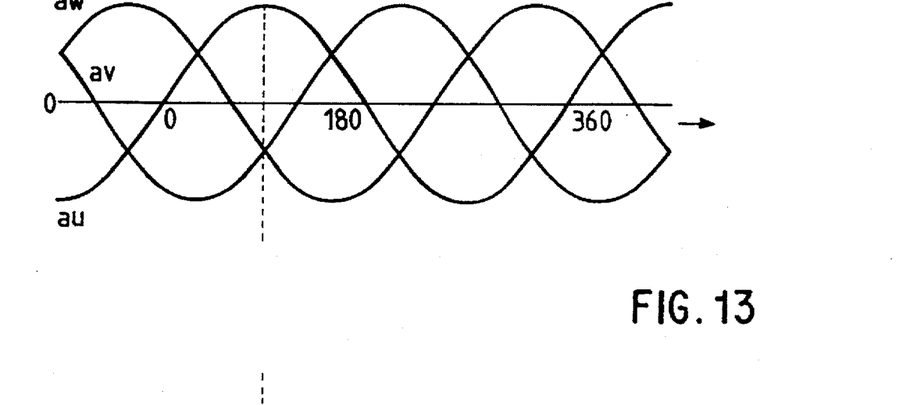
FIG. 13 is a diagram showing the mode change timing in FIG. 11(b)
Figure 13A:
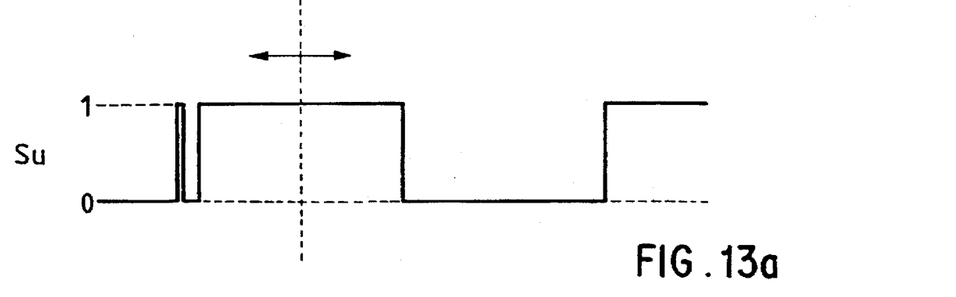
Figure 13B:
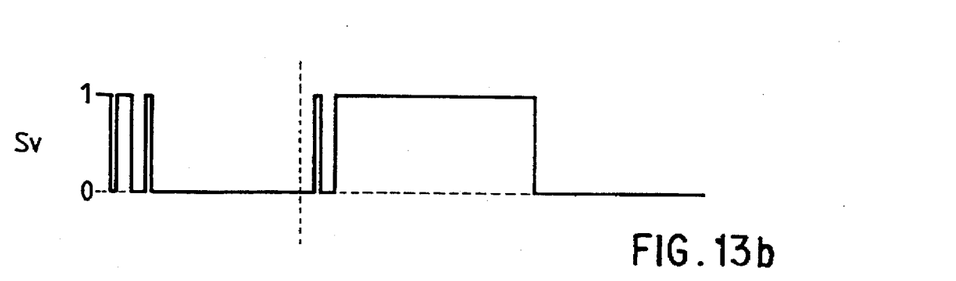
Figure 13C:
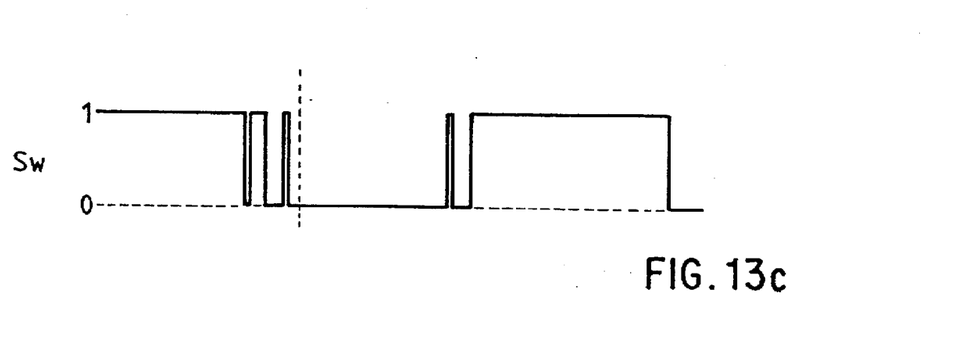

Dependent on the phase of the output voltage fundamental wave at the time when a change between the overmodulation mode and the one-pulse mode occurs, the manner in which transient fluctuations appear in a load current in the inverter and in a torque generated immediately after the mode change differs. An example of such current fluctuations is shown in FIG. 11. FIG. 11(a) shows a case where all the three phases were changed in batch at the 0° point of the U-phase of the output voltage fundamental wave (see FIG. 12), and a transient current fluctuation was observed immediately after the mode change. In contrast, FIG. 11(b) shows another case where all the three phases were changed in batch at 90° of the U-phase of the output voltage fundamental wave (FIG. 13), and there was observed almost no transient current fluctuation.

Figure 14:
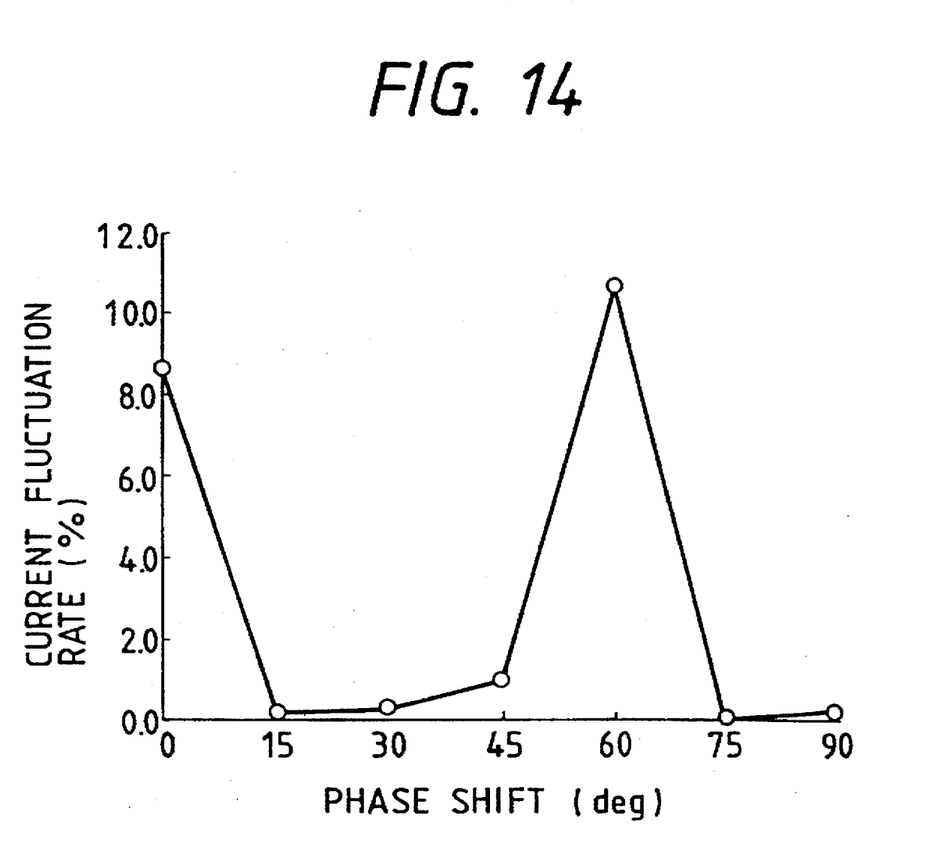
FIG. 14 is a diagram showing the relationship between the shift phase and the transient current fluctuation immediately after mode change.

FIG. 14, illustrates the relationships between the shift phase (U-phase taken as a reference) of the output voltage fundamental wave when shifting all the three phases in batch from the overmodulation mode to the one-pulse mode and transient current fluctuation, where the current fluctuation rate is defined by equation 5.

(current fluctuation rate)=[(transient peak current at mode change)−(peak steady current in one-pulse mode)]/[(peak steady current in one-pulse mode)]×100(%)  eq. 5

Figure 15:
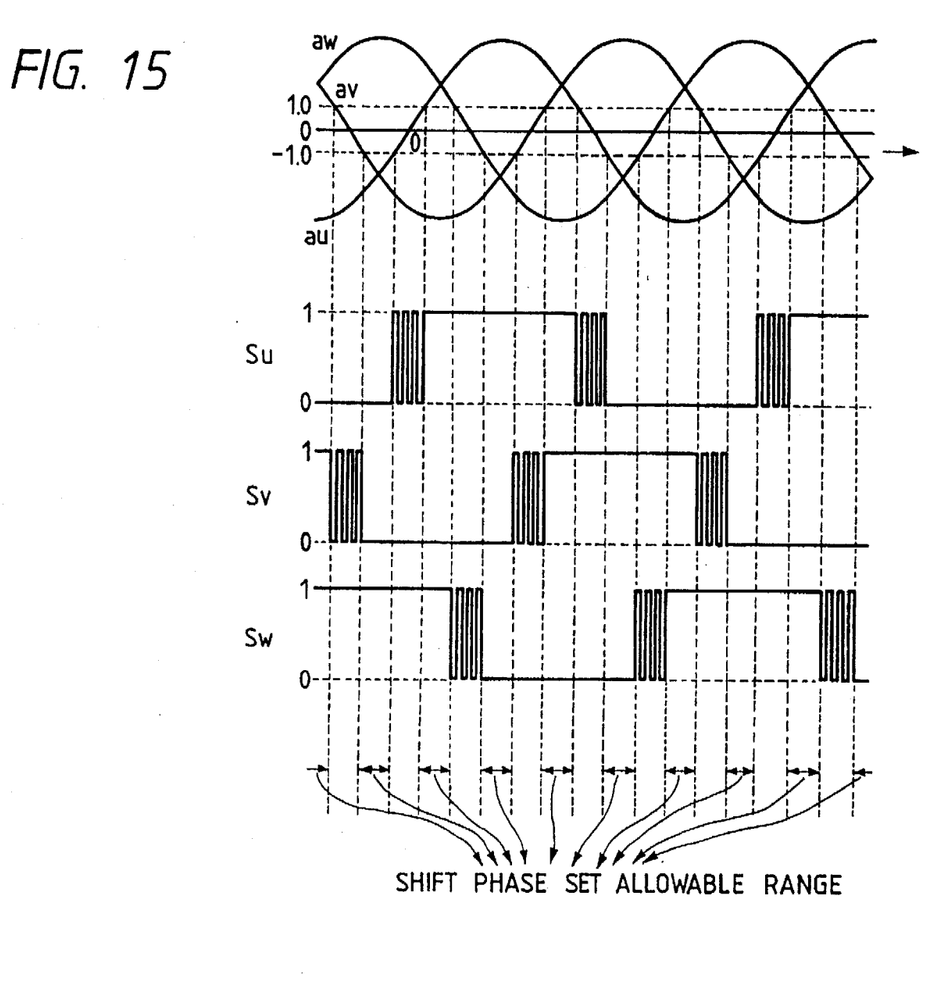
FIG. 15 is a diagram showing a shift phase set allowable region.

In FIG. 14, at every 60° of phase of the output voltage fundamental wave a large current fluctuation rate appears. This occurs where a mode change between the overmodulation and the one-pulse modes takes place while one of the three phases is in the equidistance pulse region in the overmodulation mode, thereby allowing mixed presence of both the modes, which in turn causes an increased transient unbalancing of the output voltages among three phases, and a resultant large transient current fluctuation. Therefore, according to the invention, such transient fluctuations in the current and torque can be successfully suppressed by assuring that the shift phase occurs in a portion where all the phases are in a wide pulse region and in the overmodulation mode as illustrated in FIG. 15.

In order to provide for batch mode changes of all three phases from the overmodulation mode to the one-pulse mode, it is necessary to secure a region where the output voltages in the overmodulation mode for all the three phases coincide with a wide pulse region. For this purpose, it must be arranged that at an intersection of modulation waves of any two of the three phases (that is, at the 30°, 90°, 150°, 210°, 270°, or 330° points of the reference U-phase modulation wave), the absolute value of the modulation wave is greater than 1.0. For example, in respect of 30°, where au=Asin30°>1 (and thus A>2), and where a correlation between the modulation ratio A and the output voltage E* in the overmodulation mode can be obtained by equation 2, it must hold that E*>95.6%. Therefore, in order for a batch mode change for the three phases to be executed between the overmodulation and the one-pulse mode, the shift voltage must be set at a value which is greater than 95.6%, and has at least one voltage pulse in the vicinity of the zero cross point of the output voltage fundamental wave in the overmodulation mode.

Figure 16:
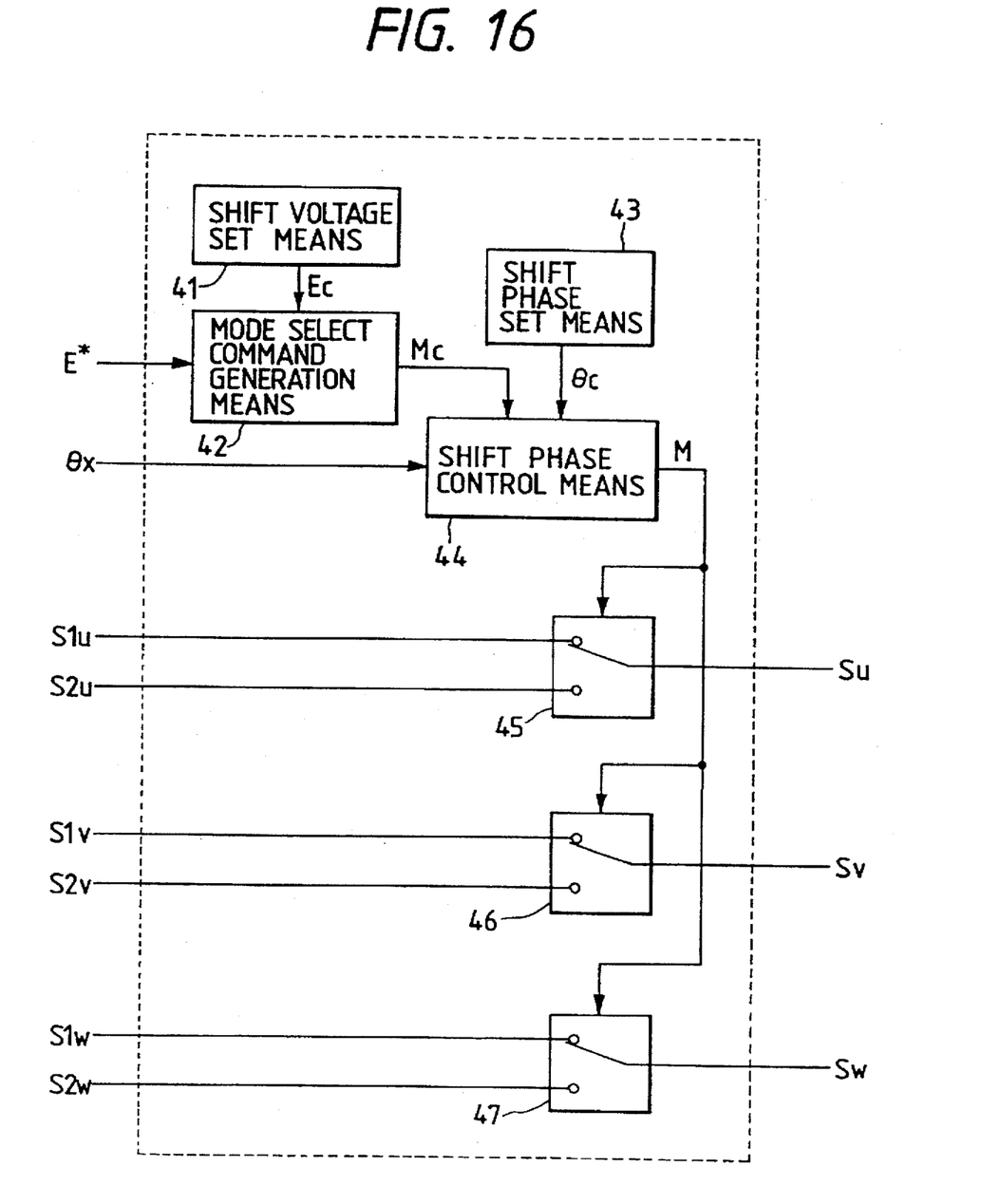
FIG. 16 shows an example of the PWM mode select means of the invention.

An example of a PWM mode select means 4 for implementing the above-mentioned shift voltage and shift phase controls of the invention is shown in FIG. 16. A mode select command generation means 42 compares a shift voltage Ec (set in a shift voltage setting unit 41) and a voltage command E*, and outputs a mode select command Mc indicating of which of the multipulse mode and the one-pulse mode is to be selected.

The mode select command Mc has been described hereinabove as being obtained on the basis of the output voltage command E*. However, since the output voltage command E* corresponds uniquely to the modulation ratio A, a particular modulation ratio Ac corresponding to the shift voltage may be preset, which is then compared with the modulation ratio A to generate the mode select command Mc.

Further, also in the variable voltage variable frequency region, since the output voltage command and the output voltage fundamental frequency correspond uniquely with each other, it may be arranged such that a particular output voltage fundamental frequency Fic which corresponds to the shift voltage may be preset beforehand. This output voltage fundamental frequency is then compared with the frequency command Fi* to generate the mode select command Mc.

A shift phase control means 44 reads Mc, and in case a mode change is required, compares phase θx of the output voltage fundamental wave and a shift phase θc set in a shift phase set means 43; then if θx=θc, it changes its mode select signal M. Dependent on the mode select signal M, mode select switches 45, 46, 47 select either one of output $S1_x$ of the multipulse generation means and output $S2_x$ of the one-pulse generation means, then determine its switching function $S_x$.

The shift phase may also be controlled by taking absolute values of the modulation wave at respective phases. If all exceed 1.0 (which indicates that all the three phases lie in a wide pulse region in the overmodulation mode), a change of output from between the multipulse generation means and the one-pulse generation means is enabled at this instance.

Thereby, a two-level inverter according to the invention has been provided which features the advantage that a gap in the output voltages at the time of mode change between the multipulse mode and the one-pulse mode can be reduced as small as 1-2% in comparison with approximately 10% in the conventional GTO inverter, thereby allowing continuous control of the output voltage from zero to its maximum value. In addition, a smooth change can be ensured between the multipulse mode and the one-pulse mode operation without causing any fluctuations in the current and the generated torque.

Figure 17:
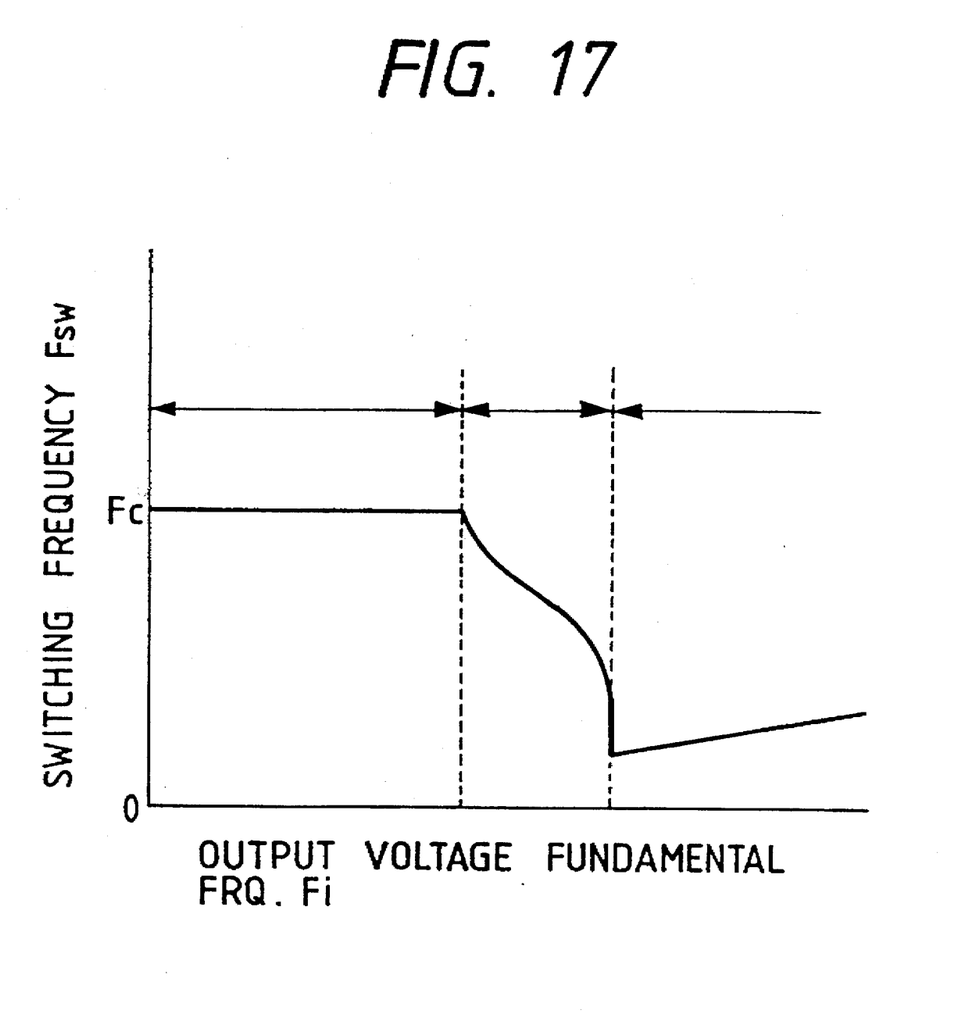
FIG. 17 is a diagram showing the relationship between the output voltage fundamental frequency of the inverter and the switching frequency according to the invention.

FIG. 17 illustrates the relationship between the output voltage fundamental frequency and the switching frequency, where there exist no such large discontinuities such as observed in FIG. 3 in respect of the conventional inverter modulation method. Thus, discontinuous tone change occurring due to the magnetic noise is eliminated.

In the inverter equipment which is capable of controlling its output voltage from zero to a maximum voltage by use of the multi-pulse mode and the one-pulse mode in conjunction according to the invention, discontinuous changes in the magnetically-induced noise can be eliminated, and a substantially continuous control over the full range of its output voltage can be accomplished as well.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electric power converter system for converting a direct current into an alternating current having a binary voltage level, to drive an electric motor, wherein the electric power converter system comprises:

a first multi-pulse generation means operating in a bipolar modulation mode for generating a gate control signal for a pulse width modulation controlled pulse having a uniform pulse generation period over a single cycle of its output voltage fundamental wave, in a low output voltage region wherein a modulation ratio A is smaller than 1;

a second multi-pulse generation means operating in an overmodulation mode for generating a gate control signal for a pulse which has a broader pulse width in the vicinity of a peak region of the output voltage fundamental wave than that in the vicinity of a zero-cross point thereof, in a high output voltage region wherein a modulation ratio A is greater than 1;

one-pulse generation means for generating a gate control signal for generating a single pulse having a same polarity as that of the output voltage fundamental wave over a half cycle of the output voltage fundamental wave in a maximum output voltage region; and means for sequentially switching outputs between said first multi-pulse generation means, said second multi-pulse generation means, and said one-pulse generation means dependent on a predetermined condition; and means for generating said alternating current in response to said sequentially switched outputs.

2. An electric power converter system according to claim 1 wherein said second multi-pulse generation means sets a pulse generation cycle of a pulse width modulated portion of its output voltage waveform independently of said output voltage fundamental frequency.

3. An electric power converter system according to claim 1 wherein said means for sequentially switching switches between the first and second multi-pulse generation means and the one pulse generation means based on one of: a pulse count in one cycle of the output voltage fundamental wave, an amplitude of an output voltage, a modulation ratio, and whenever its output voltage fundamental frequency becomes a preset value.

4. An electric power converter system according to claim 1 wherein said means for sequentially switching switches between said first and second multi-pulse generation means and said one pulse generation means when an output voltage becomes a predetermined value of at least 95.6% of its maximum output voltage.

5. An electric power converter system according to claim 1 wherein said means for sequentially switching switches between said first and second multi-pulse generation means and said one pulse generation means at a timing which is included in a broader pulse width region corresponding to a peak region of each fundamental wave of each overmodulation waveform of each phase of said inverter.

* * * * *